(12) United States Patent
Kramer

(10) Patent No.: US 7,496,195 B2
(45) Date of Patent: Feb. 24, 2009

(54) WATERPROOF FLIP PHONE CASE

(75) Inventor: Aaron F. Kramer, Golden, CO (US)

(73) Assignee: Kwik Tek, Inc., Golden, CO (US)

( * ) Notice: Subject to any disclaimer, the term of this patent is extended or adjusted under 35 U.S.C. 154(b) by 640 days.

(21) Appl. No.: 11/172,624

(22) Filed: Jun. 30, 2005

(65) Prior Publication Data

US 2007/0019804 A1    Jan. 25, 2007

(51) Int. Cl.
*H04M 1/00*    (2006.01)
*H04M 9/00*    (2006.01)
(52) U.S. Cl. ............... 379/437; 379/451; 455/575.8
(58) Field of Classification Search ............ 379/433.13, 379/451, 452, 454, 437, 440; 206/294; 24/303; 455/575.8
See application file for complete search history.

(56) References Cited

U.S. PATENT DOCUMENTS

| | | | |
|---|---|---|---|
| 522,542 A | 7/1894 | Weinheimer | |
| 1,038,351 A | 9/1912 | Graham | |
| 1,503,624 A | 8/1924 | Bauman et al. | |
| 1,540,005 A | 6/1925 | Hiering | |
| 1,566,867 A | 12/1925 | Hetzer et al. | |
| 1,712,109 A | 5/1929 | Hammer | |
| 1,837,918 A | 12/1931 | Neves et al. | |
| 1,931,707 A | 10/1933 | Quigan | |
| 2,302,300 A | 11/1942 | Davies | |
| 2,304,528 A | 12/1942 | Bafia | |
| 2,521,047 A | 9/1950 | Davis | |
| 2,599,738 A | 6/1952 | Ames | |
| 2,606,587 A | 8/1952 | Porter | |
| 2,616,470 A | 11/1952 | Rifkin | |
| 2,678,671 A | 5/1954 | Rifkin | |
| 2,907,506 A | 10/1959 | Sammons | |
| 3,111,737 A * | 11/1963 | Heil ............................ 24/303 |
| 3,477,587 A | 11/1969 | Hart | |
| 3,659,761 A | 5/1972 | Wesson | |
| 4,084,735 A | 4/1978 | Kappas | |
| 4,126,256 A * | 11/1978 | McGruder .................. 206/294 |
| 4,175,604 A | 11/1979 | Bonner | |
| 4,607,772 A | 8/1986 | Hancock | |
| 5,078,279 A | 1/1992 | Hancock et al. | |
| 5,267,643 A | 12/1993 | Scribner | |
| 5,279,510 A | 1/1994 | Remy | |
| 5,344,032 A | 9/1994 | Ramsdell | |
| 5,347,740 A | 9/1994 | Rather et al. | |
| 5,388,738 A | 2/1995 | Russell | |

(Continued)

FOREIGN PATENT DOCUMENTS

GB        221458        9/1924

(Continued)

*Primary Examiner*—Curtis Kuntz
*Assistant Examiner*—Tuan D Nguyen
(74) *Attorney, Agent, or Firm*—Sheridan Ross P.C.

(57) ABSTRACT

The present invention relates to a waterproof flip phone case having a sealing member, at least two waterproof enclosures, and a hinging member that provide a waterproof environment for a phone, specifically a flip phone. In one embodiment of the invention, the sealing member includes at least one locking mechanism that is operable to engage and disengage the sealing member to allow insertion of a flip phone into the case when the member is not engaged and prevents water from entering the enclosures when the member is engaged.

19 Claims, 4 Drawing Sheets

U.S. PATENT DOCUMENTS

| | | |
|---|---|---|
| 5,491,919 A | 2/1996 | Rather et al. |
| 5,595,333 A | 1/1997 | Boston |
| D386,304 S | 11/1997 | Hancock |
| 5,702,278 A | 12/1997 | Boucher |
| 5,769,526 A | 6/1998 | Shaffer |
| 5,797,683 A | 8/1998 | Gunzi et al. |
| 5,915,572 A | 6/1999 | Hancock |
| 6,142,349 A | 11/2000 | Roberson |
| 6,247,984 B1 | 6/2001 | Hatcher |
| 6,324,261 B1 * | 11/2001 | Merte .......................... 379/68 |
| 6,484,913 B1 | 11/2002 | Hancock et al. |
| D476,290 S | 6/2003 | Gates et al. |
| D489,180 S | 5/2004 | Kramer |
| 6,913,286 B2 | 7/2005 | Kramer |

FOREIGN PATENT DOCUMENTS

| | | |
|---|---|---|
| GB | 2161138 | 1/1986 |
| GB | 2179323 | 3/1987 |

* cited by examiner

WATERPROOF FLIP PHONE CASE

FIELD OF THE INVENTION

The present invention is directed toward a substantially impermeable phone case. More specifically, the present invention is able to accommodate either a non-flip phone or a flip phone that has a hinge, and which allows use in inclement weather on or during boating or outdoor activities.

BACKGROUND OF THE INVENTION

Cellular phones have been experiencing increasing demand over the past decade. As the use of cellular phones has increased dramatically, so has the desire to use them in any location without restriction. It is well known that water, sand or other foreign debris does not mix well with electronics, including the electronics of a cellular phone. Current products exist that protect phones from water by having an enclosed plastic case that is sealable, and therefore, waterproof. This enables the user to have their phone with them when they are enjoying water sports or in any other environment where water might be present without jeopardizing the phone.

Previous products have addressed these basic problems. Specifically, Dry Paks and Gunzi Aqua Pacs by Kwik Tek are both products that provide a waterproof case for traditional non-flip phones. These products generally include a sealing member, locking mechanisms and an enclosure member. The drawback of these present products, however, is that they are only applicable with a traditional non-flip phone. Non-flip phones are phones that do not have any folding mechanism, any hinging mechanisms, or any variation thereof. Although existing products provide a reasonable solution for this certain type of phone, they do no provide a good waterproof solution for a phone with any moving parts, especially a flip phone.

A problem with these known devices is that they do not provide adequate means to operate a flip phone. A flip phone is not able to open once it is inserted in these known devices. Another option is to have the phone opened and then insert it into these devices. However, doing so subjects the flip phone to undue stresses that could potentially damage the flip phone. Doing this could also lead to an unwanted call being sent or overusing the phone battery because the flip phone must always be in the open position A second drawback to the existing designs of these devices is that they do not provide a means for housing the antenna of phones. Antennae are a very fragile part of the phone. Especially in flip phones the antennae do not perform well under high stresses. Known devices constrain the antenna of the phone and therefore have been known to damage the antennas as well as other parts of the flip phones.

A further drawback of the existing devices is that they are not operable with any style of phone. Rather, they are designed for a single phone and thus if someone wants to upgrade their phone, they must buy a new waterproof case for that phone. This is an unnecessary burden on consumers who may want to switch their phone without switching all accessories that they owned for their previous phone.

It is therefore an aspect of the present invention to provide a waterproof flip phone case that is operable to use with any type of phone, either flip or non-flip. It is a further aspect of the invention to provide use of a phone without damaging any components of the phone while it is inside the case, and thus provide a sealable, substantially impermeable, flexible case with a transparent material that allows use of the phone while it is secured within the enclosure.

SUMMARY OF THE INVENTION

The present invention relates to a substantially waterproof flip phone device and methods of providing a waterproof enclosure for a flip phone. The selectively waterproof flip phone case generally includes a sealing member, locking mechanisms to engage and disengage the sealing member, a top enclosure, a bottom enclosure, and a hinge member. The sealing member provides access to the enclosures by disengaging and opening. The locking mechanisms can be a thumbnut, screws, clamps, or any other selective locking mechanism known in the art. Also the sealing member in one embodiment is a pair of gaskets that can be pressed together to create a fluid tight seal. However, the sealing member can also be a tooth locking arrangement, a hook and loop substantially waterproof seal or any form of watertight seal.

Once the sealing member is opened a flip phone may be placed inside the enclosure. The phone can be either a conventional non-flip phone or a flip phone that incorporates a hinge and multiple parts. When the phone is inside the case, the sealing member may be engaged by the locking mechanisms. Once engaged, the phone is inside a waterproof container and is thus safe to use underneath, or in the presence of water, or any other adverse environmental condition, which would otherwise pose a serious threat to the electronics of the phone.

In one instance of the invention, the hinge member connects the top enclosure and bottom enclosure providing a continuous waterproof case from the closed end of the top enclosure to the engaged sealing member. The hinge member allows a flip phone to be operated in both the open and closed position without damaging any part of the phone. For example, the user inserts a flip phone into the enclosures wherein a back portion of the phone goes inside one of the enclosures and the face of the phone goes inside the other enclosure. The hinge member that connects the front and back enclosures thus allows for the opening and closing motion of the flip phone while the phone is inside the waterproof case. The hinging member can be any one of a rigid hinge, a flexible hinge, a flexible material, a flexible continuation of the top and bottom enclosures or any variation thereof known in the art.

In one embodiment, the phone also includes an antenna pocket which facilitates the use of the phone without damaging the antenna. The antenna pocket can be placed anywhere on the case where an antenna of a phone might exist. For instance, with flip phones where the antenna is near the hinge of the phone, the antenna pocket would be placed near the hinge member of the case. The antenna pocket provides a space where the antenna of a phone can be extended while the phone is positioned within the case.

A further embodiment of the invention includes an interlocking member. The interlocking member is operable to connect the top enclosure and bottom enclosure when the case is in a closed state. The interlocking member can be a hook and loop material, magnets, snaps, a button, clasps, hooks or any other interconnecting means known in the art. The interlocking member ensures that while the phone is inside the case it does not open until it is desired. This helps ensure that the flip phone remains in the closed position and no undesired calls are made and the phone battery is not overused.

These and other benefits and advantages of the invention will be made apparent from the accompanying drawings and description of the drawings, as well as a detailed description of those drawings and the inventions disclosed herein.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
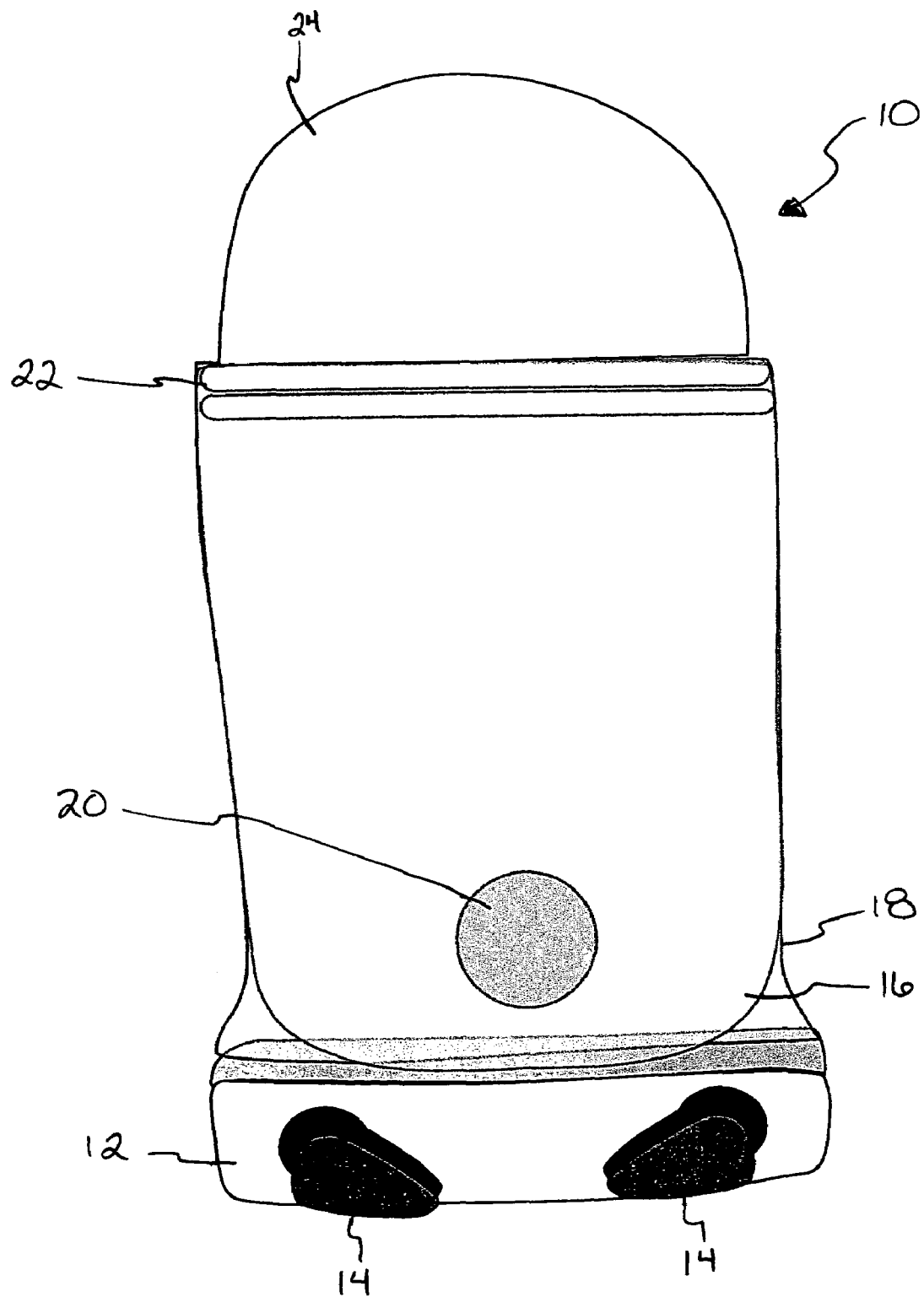
FIG. 1 is a front view of one embodiment of the closed waterproof flip phone case.

The following components and numbers associated thereto are shown in the drawings and provided here for ease of reference:

| # | Component |
| --- | --- |
| 10 | Waterproof flip phone case |
| 12 | Sealing member |
| 14 | Locking mechanism |
| 16 | Top enclosure |
| 18 | Bottom enclosure |
| 20 | Interconnection means |
| 22 | Hinging mechanism |
| 24 | Antenna pocket |
| 26 | Hole in the sealing member |
| 30 | Flip phone |
| 32 | Antenna |
| 34 | Flip phone back |
| 36 | Flip phone face |

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION

While the present invention has been illustrated by description of preferred embodiments, and while the illustrated versions have been described in considerable detail, it is not the intention of the inventors to restrict or in any way limit the scope of the pending claims to such detail. Additional advantages and modifications will readily appear to those skilled in the art upon reading this detailed description. Therefore, the invention, in its broader aspects, is not limited to these specific details, respective apparatus and methods, and illustrated samples shown and described. Accordingly, departures may be made from such details without departing from the spirit or scope of the inventor's general inventive concepts.

Referring initially to FIG. 1, there is shown a waterproof flip phone case 10. In one embodiment, the flip phone case 10 includes a sealing member 12 and a locking mechanism or locking mechanisms 14. The locking mechanisms 14 operate to engage and disengage the sealing member 12 so that water, sand, or other foreign objects are not allowed to enter the waterproof flip phone case 10 when the sealing member 12 is engaged. The locking mechanisms 14 can be a thumbnut, screws, clamps or any other locking mechanism known in the art. Although locking mechanisms are shown, it may not be necessary to utilize them if a self-locking sealing member 12 is used. In one embodiment, the sealing member 12 is a pair of gaskets on oppositely facing clips. The clips are brought together and pressed to form a watertight seal on the open end of the case 10. The locking mechanisms 14 act to secure the seal, but there exist other sealing mechanisms that could easily substitute for the sealing member 12 depicted that do not require a locking mechanism.

There is also provided a top enclosure 16, and a bottom enclosure 18. The bottom enclosure 18 is generally connected to the top enclosure 16 by a hinging mechanism 22. The top enclosure 16 and bottom enclosure 18 are made of a flexible, substantially waterproof material in a preferred embodiment. Also, the hinging mechanism 22 can be a continuation of the top enclosure 16 and bottom enclosure 18 with a minimal surface relief on one side of the hinging mechanism 22. The surface relief accommodates the folding of the top enclosure 16 over the bottom enclosure 18. In another embodiment, the hinging mechanism 22 could be a set of rigid hinges connecting the top enclosure 16 and the bottom enclosure 18. Another embodiment would have the hinging mechanism 22 simply be a continuation of the top and bottom enclosures 16 and 18 respectively but made of a slightly more flexible material that would allow for the folding motion of the flip phone. These and other arrangements of the hinge will become readily apparent to those skilled in the art after reading this description. The hinging mechanism 22 provides a means of folding the top enclosure 16 over the bottom enclosure 18 to facilitate the folding of a flip phone 30. The hinging mechanism 22 is also able to provide a continuous opening between the top and bottom enclosures, while allowing a flip phone to open and close as it is designed to. The top enclosure 16 and bottom enclosure 18, along with the hinging mechanism 22, provide an enclosed environment for any phone that is placed inside the case 10 when the sealing member 12 is engaged.

In a particular embodiment, there is also provided an interconnection means 20 which may be a hook and loop material, magnets, snaps, clasps, hooks, a button, or any other interconnection means known in the art. This interconnection means 20 prevents the phone case 10 from being opened unless the user desires the phone 30 to be open. Basically, the interconnection means 20 maintains the closed state of the flip phone 30 and case 10 automatically, until it is desired to open the phone 30.

In one embodiment, an antenna pocket 24 is provided. The antenna pocket 24 is operably connected to the top enclosure 16 and/or the bottom enclosure 18 near the hinging mechanism 22. The antenna pocket is situated to receive an antenna of either a flip phone or a non-flip phone. The antenna pocket 24 provides a means of enclosing the entire phone 30 and its antenna 32 within the waterproof enclosure 10. The antenna pocket 24 also allows the user to pull out the antenna of any phone and have it in the antenna pocket 24 so that it is not subjected to unnecessary stresses that could lead to breakage or damage of the antenna of a phone.

Figure 2:
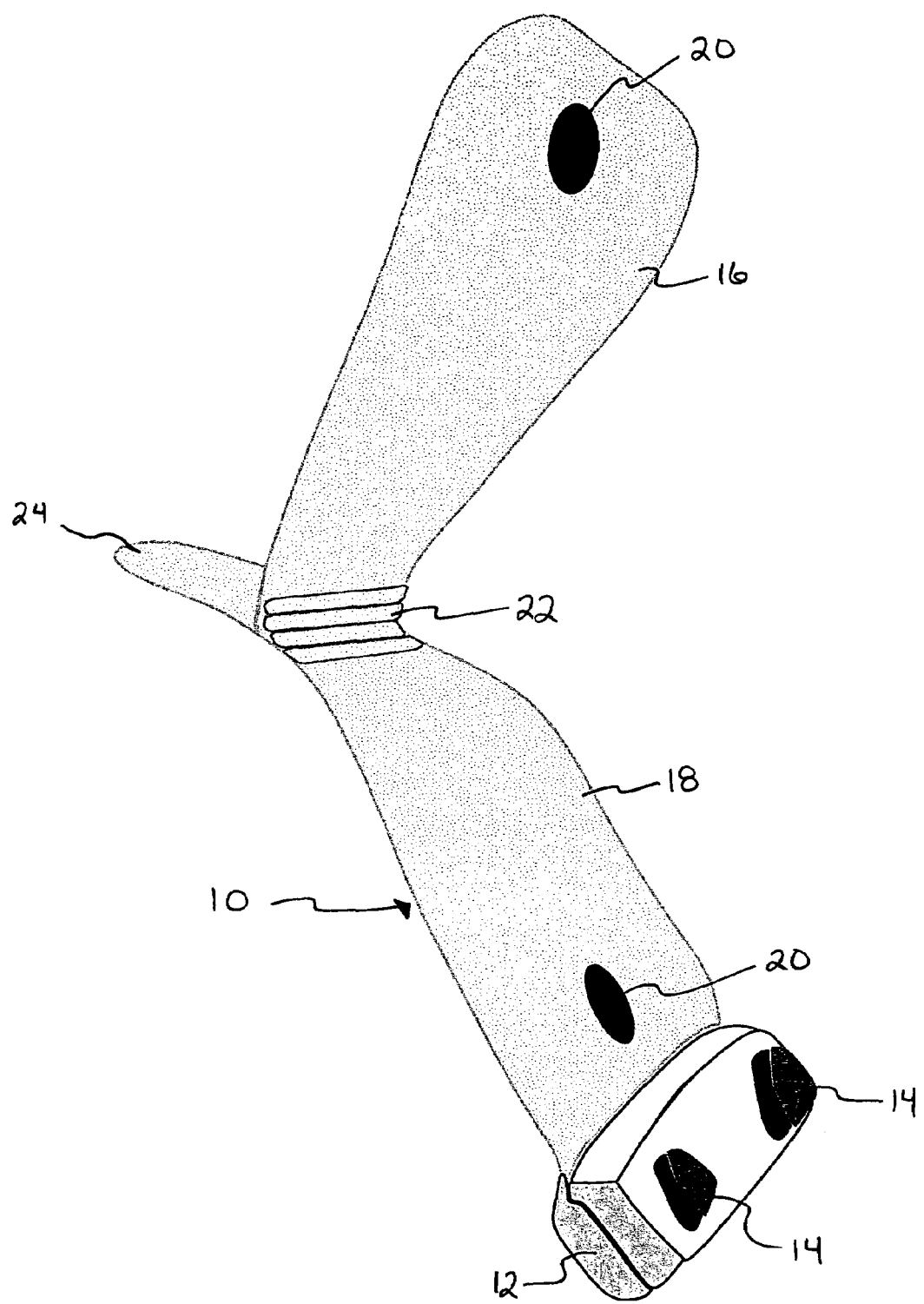
FIG. 2 is a perspective view of one embodiment of the flipped-open waterproof flip phone case.

Referring now to FIG. 2, a waterproof phone case 10 is depicted in its open state. As shown, the top enclosure 16 and the bottom enclosure 18 are connected by the hinging mechanism 22. The antenna pocket 24 is also depicted that provides for use of the antenna 32 within the phone enclosure. There is also shown both portions of the locking mechanisms 14. Additionally, the interconnection means 20 are shown to be disconnected so the case 10 is positioned in the flipped-open state.

Figure 3:
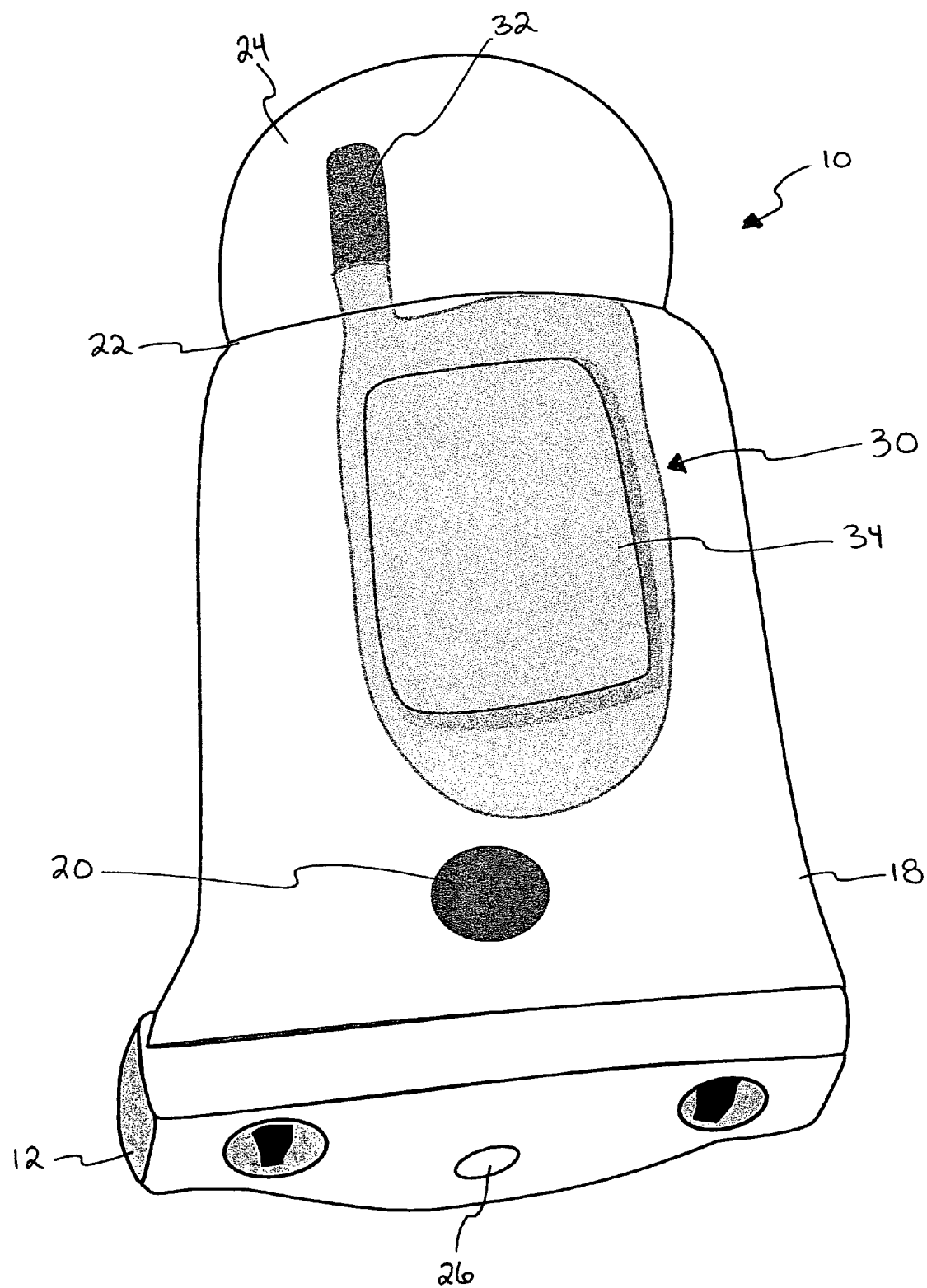
FIG. 3 is a rear view of one embodiment of the waterproof flip phone case with flip phone inside.

As can be viewed in FIG. 3, a phone 30 can be inserted into the top 16 and bottom 18 enclosures. The antenna pocket 24 provides adequate space for the antenna of a flip phone 32. In one embodiment, a flip phone 30 may be provided and the front flip phone face 36 can be inserted into the top enclosure 16 and the flip phone back 34 can be inserted into the bottom enclosure 18. There is also shown in FIG. 3 a hole in the sealing member 26 that can be used to either hold or carry the flip phone case 10. A lanyard, belt hook, rope, string, or any other fastener may be used to run through or used with this hole in the sealing member 26 to enable the user of the flip phone case 10 to carry their phone 30 and flip phone case 10 without use of their hands.

Figure 4:
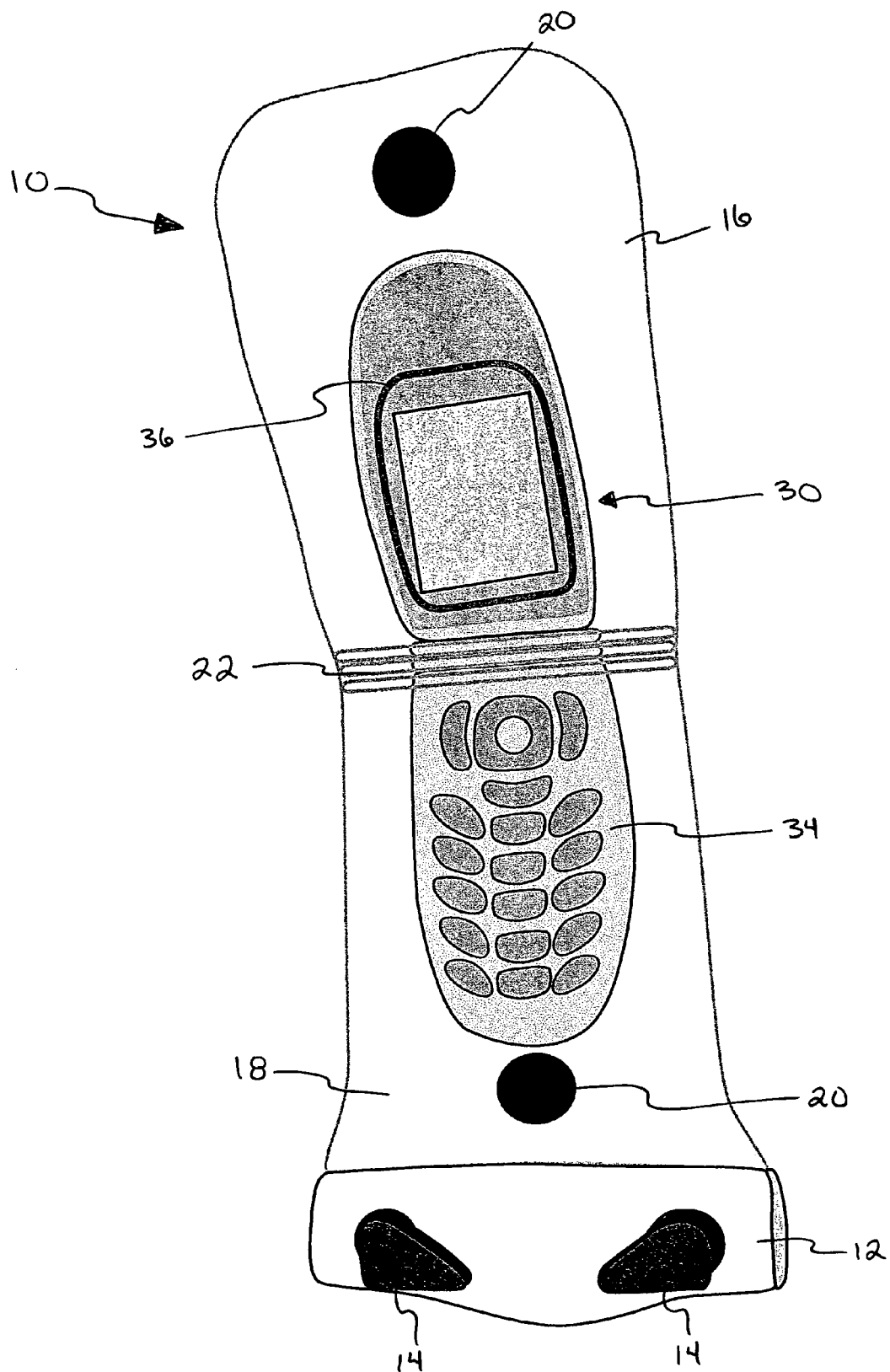
FIG. 4 is a front view of one embodiment of the flipped-open waterproof flip phone case and flip phone inside.

With respect to FIG. 4, a flip phone 30 is shown in the flip phone case 10 in an opened position. The phone front base 36 is inside the top enclosure 16 and the phone's back 34 is shown in the bottom enclosure 18. However, the flip phone back and flip phone face could be inserted in the opposite enclosures. Mainly, the flip phone face 36 can be used in the bottom enclosure 18 and the flip phone back 34 could be placed in the top enclosure 16. It is not necessary to have the phone 30 oriented in any one direction within the case 10, even though there exist preferred orientations of the phone 30.

It is not necessary to use a flip phone case in the waterproof flip phone case 10. Rather, one aspect of the invention provides that the enclosure accommodates flip phones, non-flip phones or any other object that is desired to be kept away from water, sand, or other adverse materials.

A further embodiment of the invention uses a material for the enclosures 16 and 18, hinging mechanism 22, and antenna pocket 24 that is substantially impermeable to water but still allows the transmission of sound and light. The material is generally transparent so that a user can view the phone 30 while it is in the case 10. Additionally, the user can use the phone to make a call while the phone is within the case and any sound from the speaker can be heard. Further, the receiver can pick up any sound that is made by the user.

The foregoing discussion of the invention has been presented for purposes of illustration and description. The foregoing is not intended to limit the invention to the form or forms disclosed herein. In the foregoing description, for example, various features of the invention are grouped together in one or more embodiment for the purpose of streamlining the disclosure. This method of disclosure is not to be interpreted as reflecting an intention that the claimed invention requires more features than are expressly recited in each claim. Rather, as the following claims reflect, inventive aspects lie in less than all the features of a single foregoing disclosed embodiment. Thus, the following claims are hereby incorporated into this detailed description, with each claim standing on its own as a separate preferred embodiment of the invention.

Moreover, the description of the invention has included descriptions of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claims, whether or not such alternate, interchangeable and/or equivalent structures, functions, ranges or steps are disclosed, and without intending to publicly dedicate any patentable subject matter.

What is claimed is:

1. A substantially waterproof case adapted for use with a folding phone having a face and a back, comprising:
   a first enclosure that is adapted to receive the face having an upper end and a lower end;
   a second enclosure that is adapted to receive the back having an upper end and a lower end wherein said upper end of said second enclosure is operably interconnected to said lower end of said first enclosure;
   a sealing member interconnected to at least one of said first enclosure and said second enclosure, said sealing member includes a pair of gaskets on opposing facing clips that are brought together to from a seal, and at least one locking mechanism which is employed to maintain said clips in a sealed configuration; and
   a hinging mechanism positioned between said first enclosure and said second enclosure, wherein said first enclosure and said second enclosure are rotatably interconnected, and wherein a space is provided within said hanging mechanism, wherein a portion of the folding phone is adapted to reside in said space.

2. The case of claim 1, further comprising a third enclosure interconnected to at least one of said first enclosure and said second enclosure, wherein said third enclosure is adapted for receiving an antenna of the folding phone.

3. The case of claim 2, wherein said third enclosure is in continuous open communication with at least one of said first enclosure and said second enclosure.

4. The case of claim 1, further comprising an interconnection means attached to at least one of said first enclosure and said second enclosure, wherein said interconnection is at least one of a hook and loop material, a magnet, a hook, a clasp, a button, and a snap, wherein said interconnection means can selectively interconnect said first enclosure and said second enclosure.

5. The case of claim 1, wherein said first enclosure and said second enclosure are made of a flexible, substantially impermeable material.

6. The case of claim 1, wherein said first enclosure and said second enclosure are made of a transparent, audio passive, and waterproof material.

7. A combination of a substantially waterproof foldable phone case and foldable phone, comprising:
   a foldable phone;
   a first enclosure made of a flexible, substantially impermeable material;
   a second enclosure made of a flexible, substantially impermeable material, wherein said second enclosure is hingedly interconnected to said first enclosure;
   a sealing member, wherein when said sealing member is selectively engaged, the phone case is substantially impermeable to a fluid, said sealing member including a pair of gaskets on opposing facing clips that are brought together to from a seal, and at least one locking mechanism is employed to maintain said clips in a sealed configuration; and
   wherein said case is adapted to receive said phone within said first enclosure and said second enclosure.

8. The case of claim 7, further comprising a third enclosure interconnected to at least one of said first enclosure and said second enclosure; wherein said third enclosure is adapted to receive an antenna of said foldable phone.

9. The case of claim 8, wherein said third enclosure is in continuous open connection between at least one of said first enclosure and said second enclosure.

10. The case of claim 7, further comprising at least one locking mechanism interconnected to at least one of said first enclosure and said second enclosure, wherein said sealing member is selectively engaged and disengaged by said at least one locking mechanism.

11. The case of claim 7, further comprising an interconnection means attached to at least one of said first enclosure and said second enclosure, wherein said interconnection means is at least one of a hook and loop material, a magnet, a hook, a clasp, a button, and a snap, and wherein said interconnection means can selectively interconnect said first enclosure and said second enclosure.

12. The case of claim 7, further comprising a hinging means interconnected to at least one of said first enclosure and said second enclosure, wherein said hinging means provides continuous open communication between said first enclosure and said second enclosure.

13. The case of claim 7, wherein said first enclosure and said second enclosure are made of a transparent, audio passive, and waterproof material.

14. A substantially waterproof case adapted to receive a folding phone comprising:
 a first enclosure;
 a second enclosure operably interconnected to said first enclosure;
 a third enclosure operably interconnected to at least one of said first enclosure and said second enclosure, wherein said third enclosure is adapted to receive an antenna of the folding phone; and
 a selectively opening sealing means interconnected to at least one of said first enclosure and said second enclosure, wherein when said sealing means is engaged it is substantially impermeable to a fluid, said sealing means includes a pair of gaskets on opposing facing clips that are brought together to from a seal, and at least one locking mechanism is employed to maintain said clips in a sealed configuration.

15. The case of claim 14, further comprising an interconnection means attached to at least one of said first enclosure and said second enclosure, wherein said interconnection means is at least one of a hook and loop material, a magnet, a hook, a clasp, a button, and a snap.

16. The case of claim 15, wherein said interconnection means is operable in a first state of said case to maintain said first state, and wherein said interconnection means is not operable in a second state of said case.

17. The case of claim 14, further comprising at least one locking mechanism interconnected to at least one of said first enclosure and skid second enclosure, wherein said sealing member is operably engaged and disengaged by said at least one locking mechanism.

18. The case of claim 14, further comprising a hinging means interconnected to at least one of said first enclosure and said second enclosure, wherein said hinging means is at least one of a flexible material and a rigid hinge and wherein said hinging means provides continuous open communication between said first enclosure and said second enclosure.

19. The case of claim 14, wherein said first enclosure, and said second enclosure are made of a transparent, audio passive, and waterproof material.

\* \* \* \* \*